United States Patent
Pozgainer et al.

[11] Patent Number: 5,983,963
[45] Date of Patent: Nov. 16, 1999

[54] ON-BOARD REFUELING VAPOR RECOVERY SYSTEM WITH FUEL INLET STUB VENTING

[75] Inventors: Günther Pozgainer, Graz; Sandor Palvölgyi, Gleisdorf; Bernhard Maier, Bad Gleichenberg, all of Austria

[73] Assignee: Tesma Motoren-Und Getriebetechnik GmbH, Preding-Krottendorf, Austria

[21] Appl. No.: 09/085,656

[22] Filed: May 28, 1998

[30] Foreign Application Priority Data

Jun. 6, 1997 [AT] Austria .................................. 973/97

[51] Int. Cl.⁶ ........................................ B65B 31/06
[52] U.S. Cl. ..................... 141/302; 141/348; 141/59; 141/301; 220/86.2; 220/746; 137/588; 137/589
[58] Field of Search ................... 141/52, 53, 59, 141/301, 302, 304, 305, 307, 312, 348–350; 137/587–589; 220/86.1, 86.2, 746

[56] References Cited

U.S. PATENT DOCUMENTS

| 4,742,809 | 5/1988 | Ito et al. .................... 220/746 |
| 4,809,863 | 3/1989 | Woodcock et al. ............ 220/746 |
| 4,809,865 | 3/1989 | Mori et al. ................. 220/86.2 |
| 4,836,835 | 6/1989 | Harris et al. ............... 220/86.2 |
| 4,941,587 | 7/1990 | Terada ...................... 220/86.2 |
| 5,099,880 | 3/1992 | Szlaga et al. ............... 137/587 |
| 5,183,087 | 2/1993 | Aubel et al. ................. 141/59 |
| 5,215,132 | 6/1993 | Kobayashi ................... 141/302 |
| 5,404,906 | 4/1995 | Aoshima et al. .............. 137/587 |
| 5,437,317 | 8/1995 | Takatsuka et al. ............ 141/312 |
| 5,848,626 | 12/1998 | Kim ......................... 141/348 |

Primary Examiner—J. Casimer Jacyna
Attorney, Agent, or Firm—Frishauf, Holtz, Goodman, Langer & Chick, P.C.

[57] ABSTRACT

To provide a simple on-board refueling vapor recovery (ORVR) system without separate check valves and the like, a multi-path valve, typically a 6/2 valve (5) is provided, and formed with a discrete switching path (13) which is inserted in a pressure equalization line (12). Upon valve operation between a fuel filling mode position and an operating mode position, respectively, the valve switches the discrete switching path of the pressure equalization line (12) to connect the equalization line (12) to a fuel vapor receptor through a valve outlet when the valve (5) is in operating mode position, while blocking the equalization line (12) when the valve (6) is in filling mode position. A roll-over valve (14) can be integrated into the system, preferably coupled to a small-diameter pressure equalization duct (15) with a fill vent line (3) which, by operation of the valve, is open when a nozzle (9) is introduced into a filling stub (2) for the fuel tank, but closed when the nozzle is removed, leaving only an operating vent line (4), the pressure equalization line (12) and the small-diameter pressure equalization duct (15) in communication with the outlet from the valve leading to vapor receptor.

5 Claims, 1 Drawing Sheet

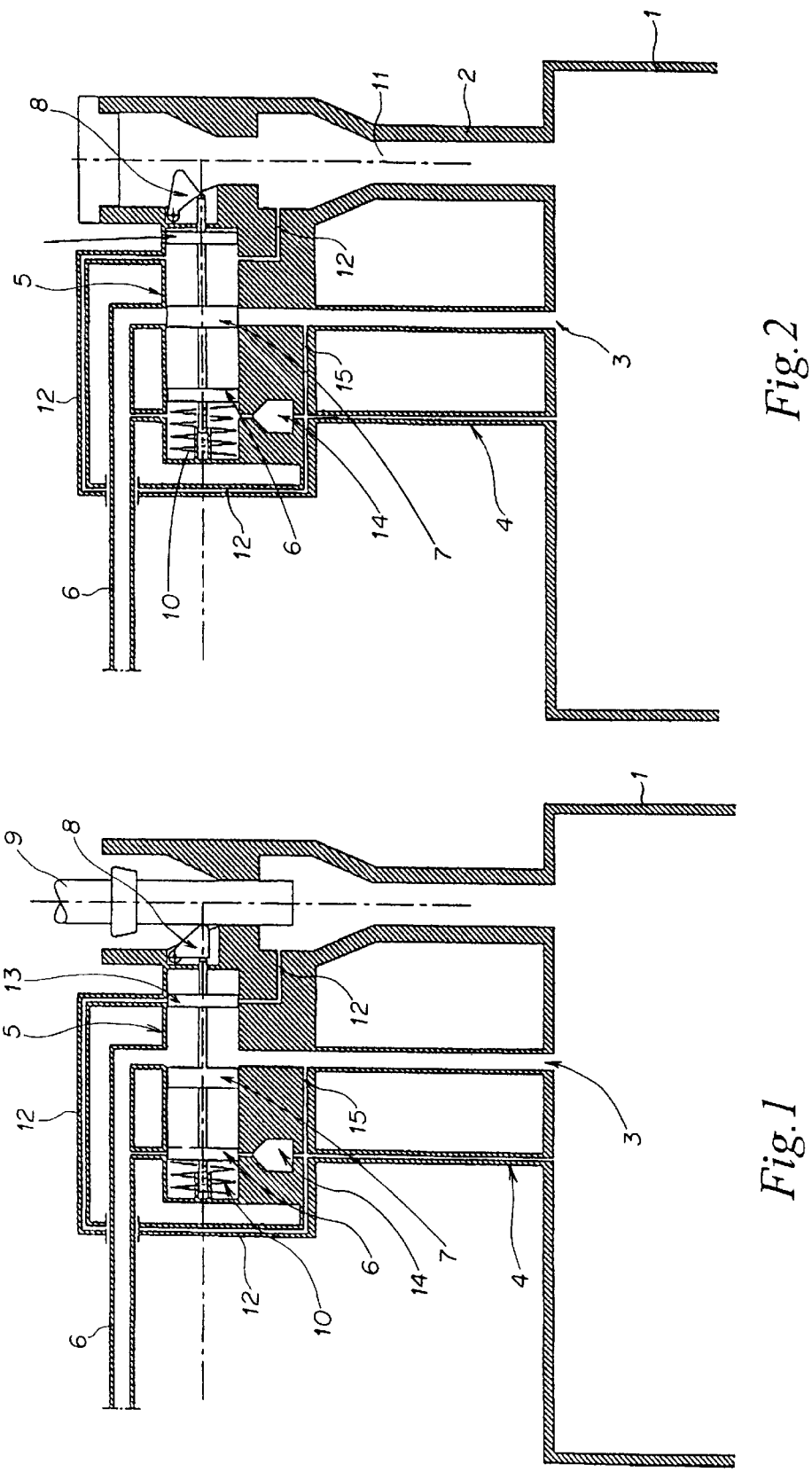
*Fig.1*   *Fig.2*

ON-BOARD REFUELING VAPOR RECOVERY SYSTEM WITH FUEL INLET STUB VENTING

FIELD OF THE INVENTION

The present invention relates to an on-board refueling vapor recovery (ORVR) system used in the fuel inlet stub leading to a fuel tank, e.g. to provide operating fuel for an automotive vehicle, and more particularly to an arrangement to prevent fuel from reaching a vapor receptor through pressure equalization lines in the fuel supply system,

BACKGROUND

ORVR systems, although not restricted to automotive vehicles, is particularly suitable for use therewith. A fuel tank can receive fuel through an inlet pipe which has an inlet stub, of a diameter which is dimensioned to build up a column of fuel when fuel is filled into the tank. Apparatus is provided to control the liquid level and vapor flow which includes a filling vent line of a diameter sufficiently large to provide venting during fuel being filled into the tank, and an operating vent line, of a dimension small with respect to the diameter of the filling vent line, as well as a multipath valve which has a valve operating element, for example a pin or a cam, which controls the valve operation. Both the filling vent line and the operating vent line are coupled to the multipath valve. The multipath valve has an outlet to lead vapors vented through the valve to a vapor receptor. The valve operating element, in dependence on whether a fuel fill nozzle is present or absent in the fuel inlet stub, is operable to shift a valve fluid path between a filling mode position, when the nozzle is present, and an operating mode position, for example for operation of the vehicle and after the filling is completed and the nozzle is absent. In the filling mode position, the filling vent line is open, and in communication with the outlet leading to the vapor receptor, while the operating vent line is blocked. In the operating mode position, that is, when the filling nozzle is absent, the operating vent line is open and in communication with the outlet from the valve and hence the vapor receptor, while the filling vent line is blocked. A pressure equalization duct, of a diameter small with respect to the diameter of the filling vent line, is coupled from an end of the filling stub, for communication with the vapor receptor.

This type of arrangement is portion of an on-board refueling vapor recovery (ORVR) system in order to permit vapors, arising upon filling a fuel tank of the vehicle, that is, filling the tank "on board", to be connected to the vapor receptor. Typically, the vapor receptor has an active carbon filter. In operation, the active carbon filter is flushed with fuel vapors operating the vehicle, which dissolve off residues of fuel from the filter and lead it to combustion in an internal combustion engine.

The system described is part of a "liquid seal" system in which a column of fuel liquid builds up in the inlet stub, to form what might be termed a liquid seal to prevent escape of fuel vapors via the inlet stub. To form such a liquid column, the inlet stub is formed with a comparatively narrow cross section. This narrow cross section, however, has the result that the liquid column, after the fuel filling operation is terminated, tends to remain in the inlet stub, unless special arrangements are made to provide for draining of the inlet stub after the fuel filling operation is terminated.

To provide for draining of the liquid column, it has previously been proposed to provide a vapor pressure equalization line, located at an upper end of the inlet stub and in communication with the fuel vapor receptor. Such a vapor pressure equalization line must be so constructed that escape of fuel into the vapor receptor is prevented through the pressure equalization line. To ensure that no fuel can reach the vapor receptor, additional elements were used, such as check valves and switching valves in the pressure equalization line; such additional elements and valves increase assembly and manufacturing costs and additional contribute to the complexity of the overall system.

THE INVENTION

It is an object to provide an on-board refueling vapor recovery system which is simple, effective, and can be constructed at low cost, and is readily compatible with draining of inlet stubs which operate with the "liquid seal" effect.

Briefly, the valve, already present to switch vapor in dependence on its position, that is, whether in filling mode or operating mode, is formed to have a discrete switching path which, in the operating mode, opens the pressure equalization line while, in the filling mode, closes the pressure equalization line.

The additional switching path can be easily made when the valve is a spool valve by merely adding an additional valving element to the typical spool valve piston.

The construction in accordance with the present invention eliminates separate check valves and control valves for the pressure equalization line in the fill stub. The already present multipath valve used for the filling vent line and the operating vent line is also used to control the vapor pressure equalization line. Thus, only a single valve is needed, directly controlled by the presence, or absence, respectively, of a filling nozzle in order to meet the object of the present invention.

In accordance with a preferred feature of the invention, the ORVR system is combined with a roll-over valve. Roll-over valves are valves which are so constructed that if the vehicle should turn over, or roll over, that is, the tank is above the remainder of the vehicle, the valve closes and prevents escape of fuel. Such a roll-over valve is included in the operating vent line during normal operation of the vehicle. If the vehicle should turn over, escape of fuel over the operating vent line is prevented by the roll-over valve, so that fuel cannot reach the vapor receptor and the ORVR recycling system.

In accordance with a preferred feature of the invention, and particularly when combined with a roll-over valve, the pressure equalization line is led in common with the operating vent line via the roll-over valve to the vapor receptor after having passed the multi-path valve. Thus, only a single roll-over valve is necessary in order to protect the pressure equalization line against danger of escape of fuel in case of roll-over.

In accordance with a particularly advantageous feature of the invention, a small-diameter pressure equalization duct is coupled to the upper end of the filling vent line which, in common with the operating vent line and the pressure equalization line, is guided via the roll-over valve to the vapor receptor. The pressure equalization duct—similarly to the pressure equalization line at the upper end of the fill stub— serves to provide for drainage of the liquid column which remains after a fuel fill within the fill vent line, and thus is reliably safely closed by the roll-over valve in case of vehicle turn-over.

In accordance with a particularly preferred embodiment of the invention, the multi-path valve is a six-port/two-way (6/2) valve, having a control pin or control cam which extends into the interior of the inlet stub and is operated to shift, against spring pressure, upon engagement with a fill-in nozzle. This provides for particularly compact and inexpensive manufacture, especially if the valve is of a triple piston— spool valve type.

DRAWINGS

FIG. 1 is a highly schematic cross-sectional view of the structure and structure of the present invention, in which the valve is in She position with a fuel-filled nozzle inserted; and FIG. 2 is a view similar to FIG. 1, in which the valve is in operating mode, that is, with a fuel fill-in nozzle removed.

DETAILED DESCRIPTION

The valve shown in FIGS. 1 and 2 is coupled to a vehicular fuel tank 1 which, in turn, is connected to a fuel fill-in stub 2. A comparatively large-diameter fill vent line 3 and a comparatively small-diameter operating vent line 4 are, respectively, coupled to the tank 1. The connection of the vent lines and the stub 2 to the tank 1 is shown only schematically. In reality, and as well known to those in the art, the fill-in stub 2 usually terminates close to the bottom of the tank 1. The operating vent line usually starts at an outward bulb or dome-shaped space at the upper side of the tank 1. In connection with a respective operation of blocked or open switched condition of the operating vent line 4, the well-known excess fill prevention function is thus attained.

The fill vent line 3 and the operating vent line 4 are both coupled to a multi-path valve 5, as will be described in detail below; the valve 5 in turn is connected to an outlet line 6 which leads to a vapor receptor of an ORVR recycling system. The vapor receptor is not shown since it is well known and standard in the industry.

The multi-path valve 5 has a control piston 20 for, respectively, opening or blocking the operating vent line 4, and a control piston 7 for, respectively, blocking or opening the filling vent line 3. The control pistons 20, 7 are controlled and operated by a central piston rod which is extended to form a pin or control cam 8, located in interfering position with respect to a fuel fill-in nozzle 9 within the inlet stub 2. The fill-in nozzle 9 is only shown schematically in FIG. 1. FIG. 1 illustrates the mode of the system when fuel is being filled. The operating vent line 4 is blocked in the valve 5; the fill vent line 3, however, is open. In FIG. 2, the position of the valve is shifted since the nozzle has been removed. FIG. 2 illustrates the mode of valve 5 in which the operating vent line 4 is open, whereas the filling vent line 3 is blocked. The multi-path valve 5 is resiliently biassed by a spring 10 in the position shown in FIG. 2.

As schematically shown in FIGS. 1 and 2, the inlet stub 2 has a constricted cross section, shown at 11. Upon filling fuel, a liquid column will build up within the filling stub 2, and prevent escape of fuel vapors via the filling stub into the ambient surrounding. The constriction 11 is so dimensioned that, after the end of filling, a liquid column will remain within the fill stub 2. In order to provide for drainage of the liquid column from the filling stub 2 into the tank 1, after filling has been terminated, a pressure equalization line 12 is provided, connected to the upper end of the fill stub 2.

In accordance with the present invention, the pressure equalization line 12 is conducted over a further switching path of the multi-path valve 5, controlled by a further piston 13 which, when the valve is in the filling mode, blocks the pressure equalization line 12 (FIG. 1) but, in the operating mode (FIG. 2), connects the line 12 to the outlet line 6, as will be described in detail below.

The pressure equalization line 12, after passing the multi-path valve 5, is connected to a roll-over valve 14, for example in form of a check valve, which roll-over valve is inserted in the operating vent line 4 and in advance of the portion of the operating vent line 4 leading to the valve chamber of valve 5. In an alternative construction, the roll-over valve 5 could be placed downstream of the multi-path valve 5, in which the case the pressure equalization line 12 would be coupled to the operating vent line 4 also downstream of the multi-path valve 5 and in advance of the roll-over valve 14.

It is possible that a liquid column will remain in the filling vent line 3. To prevent this, the upper vent of the filling vent line 3 is coupled to a small-diameter pressure equalization duct 15 which also is connected to the input of the roll-over valve 14.

Operation

For filling fuel (FIG. 1), the operating vent line 4 and the pressure equalization duct 15 are blocked by the piston 20; the pressure equalization line 12 is blocked by the piston 13 of the multi-path valve 5. Only the comparatively large-diameter filling vent line 3 is open for communication with the outlet line 6 leading to the vapor receptor. After the filling process has been terminated, and the nozzle 9 removed (see FIG. 2), the spring 10 shifts the valve pistons to the right. The filling vent line 3 is now closed by the piston 7 of the valve 5, whereas the operating vent line 4, the pressure equalization line 12 and the pressure equalization duct 15 are in communication with the outlet 6 leading to the vapor receptor, having first passed through the roll-over valve 14. In operating condition, thus, the tank 1 has no pressure therein, and pressure-free condition of fuel therein, fuel in the filling stub 2 and the filling vent line 3 is ensured.

The multi-path valve 5 is, preferably and as shown, in form of a spool valve with shiftable pistons; other valves can be used, and any suitable valve have similar function, particularly any 6/2 valve can be used. Operation of the valve by the filling nozzle can be done in any way well known in the art, and the showing of a pin and/or cam is merely illustrative.

Various changes and modifications may be made within the scope of the inventive concept.

We claim:

1. In an on-board refueling vapor recovery (ORVR) fuel filling system, optionally for an automotive vehicle, wherein the system includes a fuel tank (1); and a fill stub (2) having a diameter dimensioned to build up a column of fuel during filling of fuel into the tank (1), an apparatus for control of liquid level and vapor flow, said apparatus comprising a filling vent line (3) having a diameter sufficiently large to provide venting during a fuel filling operation;

an operating vent line (4) having a diameter small with respect to the diameter of the filling vent line (3);

a multi-path valve (5) having a valve operating element (8) controlling the operation of the valve, said filling vent line (3) and said operating vent line (4) being both coupled to said multi-path valve (5);

outlet coupling means (6) connected to said multi-path valve (5) for leading vapors vented through said valve to a fuel vapor receptor;

wherein said valve operating element (8) in dependence on introduction of a fuel nozzle (9), or absence of the fuel nozzle (9), in the inlet stub (2) is operable to shift fluid flow paths between a filling mode position, when the fuel nozzle is present in the fill stub (2), in which the filling vent line (3) is open and in communication with said outlet coupling means (6) while the operating vent line (4) is blocked, and an operating mode position, when the fuel nozzle (9) is absent, in which the operating vent line (4) is open and in communication with said outlet coupling means (6) while the filling vent line (3) is blocked; and a pressure equalization line (12) of a diameter small with respect to the diameter of the filling vent line (3) coupled to an upper end of the fill stub (2), wherein, in accordance with the invention, a discrete fluid switching path (13) is provided in said multi-path valve (5) and inserted in said pressure equalization line (12), wherein said discrete switching path connects said pressure line (12) with said outlet means (6) to the vapor receptor when said valve (5) is in operating mode position, while blocking the pressure equalization line (12) when said valve (5) is in filling mode position.

2. The apparatus of claim 1, further including a roll-over valve (14), wherein said pressure equalization line (12) and said operating vent line (4) are connected, in common, through said multi-path valve (5) and the roll-over valve (14) to the vapor receptor.

3. The apparatus of claim 2, further including a small-diameter pressure equalization duct (15) having a diameter small with respect to the diameter of the fill vent line (3) and coupled to an upper end of the fill vent line (3), said small-diameter pressure equalization line (12) being coupled, in common, with the operating vent line (4) and the pressure equalization line (12) through the roll-over valve (14) to said vapor receptor.

4. The apparatus of claim 1, wherein the operating element (8) of the multi-path valve (5) extends into the interior of the fill stub (2) and said multi-path valve includes an operating rod and is a rod-operated 6/2 valve.

5. The apparatus of claim 4, wherein said operating rod comprises an operating pin or cam positioned in interfering relationship with respect to the nozzle (9) to be introduced into the fill stub (2), and operable by said nozzle against the force of a bias spring (10) within said multi-path valve (5).

* * * * *